US011440558B2

United States Patent
Ishioka et al.

(10) Patent No.: US 11,440,558 B2
(45) Date of Patent: Sep. 13, 2022

(54) VEHICLE CONTROL DEVICE

(71) Applicant: HONDA MOTOR CO., LTD., Tokyo (JP)

(72) Inventors: Atsushi Ishioka, Wako (JP); Kanta Tsuji, Wako (JP); Daiki Nishida, Wako (JP); Shigehiro Honda, Wako (JP); Takafumi Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 250 days.

(21) Appl. No.: 16/718,974

(22) Filed: Dec. 18, 2019

(65) Prior Publication Data
US 2020/0198648 A1 Jun. 25, 2020

(30) Foreign Application Priority Data
Dec. 21, 2018 (JP) .............................. JP2018-239367

(51) Int. Cl.
*B60W 50/00* (2006.01)
*G05D 1/00* (2006.01)
*B60W 30/18* (2012.01)

(52) U.S. Cl.
CPC ...... *B60W 50/00* (2013.01); *B60W 30/18163* (2013.01); *G05D 1/0088* (2013.01);
(Continued)

(58) Field of Classification Search
CPC ........... B60W 50/00; B60W 30/18163; B60W 2554/00; B60W 2050/0095;
(Continued)

(56) References Cited

U.S. PATENT DOCUMENTS 6,175,803 B1* 1/2001 Chowanic .............. G01C 21/34
340/988
2013/0110343 A1* 5/2013 Ichikawa ........... G01C 21/3415
701/23
(Continued)

FOREIGN PATENT DOCUMENTS

JP 5382218 B2 1/2014
JP 2018-154245 A 10/2018

OTHER PUBLICATIONS

Office Action dated Nov. 2, 2021 issued over the corresponding Japanese Patent Application No. 2018-239367 with the English translation thereof.

*Primary Examiner* — Russell Frejd
*Assistant Examiner* — Ellis B. Ramirez
(74) *Attorney, Agent, or Firm* — Carrier Blackman & Associates, P.C.; Joseph P. Carrier; Jeffrey T. Gedeon

(57) ABSTRACT

An automated driving control unit sets an automated driving state to a first automated driving state (step S3), in a case that an automated driving instruction unit has instructed the initiation of automated driving in a state in which a destination is set by a destination setting unit, sets the automated driving state to a second automated driving state (step S4), in a case that the automated driving instruction unit has instructed the initiation of automated driving in a state in which the destination is not set by the destination setting unit, and causes the automated driving state to transition from the first automated driving state to the second automated driving state (step S13), in a case that a current travel position lies outside of a travel route during the travel control in the first automated driving state.

8 Claims, 10 Drawing Sheets

(52) U.S. Cl.
CPC . *B60W 2050/0095* (2013.01); *B60W 2554/00* (2020.02); *G05D 2201/0213* (2013.01)

(58) Field of Classification Search
CPC ........... B60W 30/18009; B60W 50/08; B60W 2520/10; B60W 2720/10; B60W 2420/52; B60W 2556/10; B60W 2554/406; B60W 2420/42; B60W 2540/215; B60W 2556/50; B60W 2540/10; B60W 50/14; G05D 1/0088; G05D 2201/0213; G05D 1/0061; G05D 1/0214; G08G 1/16; G08G 1/09623; G08G 1/09626; G08G 1/166
USPC ........ 701/23, 27, 58, 70, 93, 96; 700/12, 13, 700/255, 903
See application file for complete search history.

(56) References Cited

U.S. PATENT DOCUMENTS

| | | | |
|---|---|---|---|
| 2017/0151958 A1* | 6/2017 | Sakuma | G01C 21/3658 |
| 2017/0225685 A1* | 8/2017 | Aoki | B60Q 1/346 |
| 2017/0297576 A1* | 10/2017 | Halder | B60W 30/18163 |
| 2017/0308094 A1* | 10/2017 | Abe | G08G 1/0968 |
| 2018/0208211 A1* | 7/2018 | Chiba | B60W 50/082 |
| 2019/0039626 A1* | 2/2019 | Hatano | B60W 30/14 |
| 2019/0146495 A1* | 5/2019 | Yan | B60W 40/08 701/26 |
| 2019/0220027 A1* | 7/2019 | Nakayama | H02J 7/007 |
| 2019/0291744 A1* | 9/2019 | Mimura | B60W 30/18163 |

\* cited by examiner

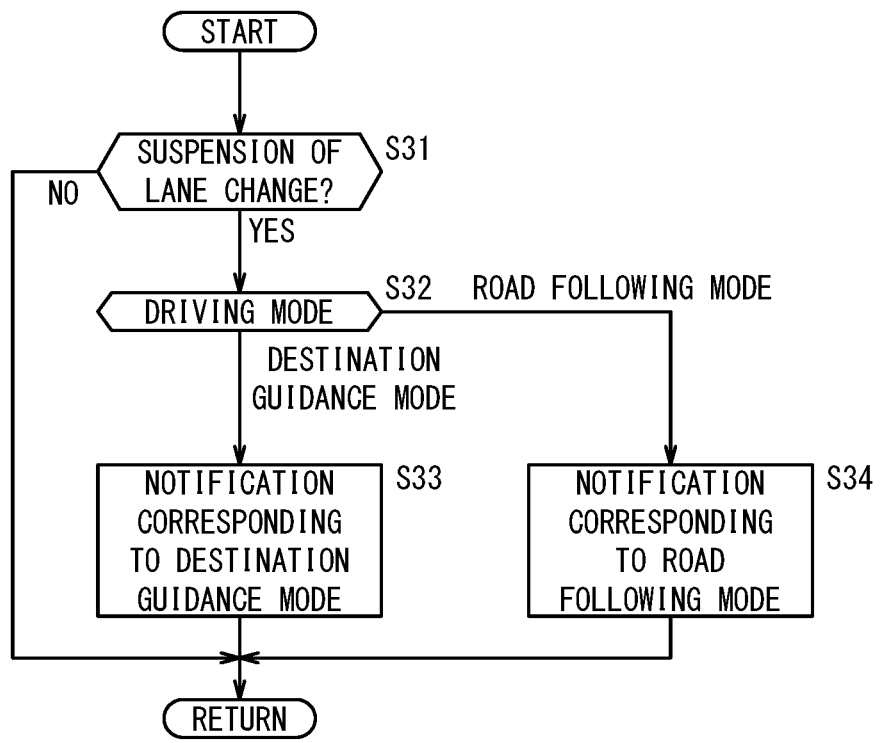

VEHICLE CONTROL DEVICE

CROSS-REFERENCE TO RELATED APPLICATION

This application is based upon and claims the benefit of priority from Japanese Patent Application No. 2018-239367 filed on Dec. 21, 2018, the contents of which are incorporated herein by reference.

BACKGROUND OF THE INVENTION

Field of the Invention

The present invention relates to a vehicle control device in which all or a portion of the driving operations of a host vehicle are performed on the basis of a set control state.

Description of the Related Art

In recent years, a vehicle control device has been developed in which all or a portion of the driving operations of a host vehicle are performed on the basis of a set control state. In Japanese Patent No. 5382218, a device is disclosed in which, in the case that a destination is set, a route is generated along which a host vehicle is automatically driven to the destination, and in the case that the destination is not set, a route is generated along which the host vehicle is made to travel along the road.

SUMMARY OF THE INVENTION

According to Japanese Patent No. 5382218, no assumption is made concerning a situation after a driving mode has been set, and more specifically, after automated driving to the destination, or automated driving for traveling along the road has been initiated. After automated driving has been initiated in a certain driving mode, a case may occur in which the situation of the host vehicle or the situation of the external environment may undergo a change, and the set driving mode cannot be continued. In such a case, if automated driving is simply canceled, the load imposed on the vehicle occupant (driver) increases.

The present invention has been devised taking into consideration the aforementioned problems, and has the object of providing a vehicle control device in which it is possible to reduce a load imposed on the vehicle occupant.

According to a first aspect of the present invention, the vehicle control device comprises:
  an automated driving instruction unit configured to instruct initiation of automated driving of a host vehicle by an operation of a vehicle occupant;
  a destination setting unit configured to set a destination by an operation of the vehicle occupant, together with generating a travel route to the destination in accordance with setting of the destination;
  a position specifying unit configured to specify a travel position of the host vehicle; and
  an automated driving control unit configured to set an automated driving state, together with performing a travel control for the host vehicle in accordance with the automated driving state;
  wherein the automated driving control unit:
  sets the automated driving state to a first automated driving state, in a case that the automated driving instruction unit has instructed the initiation of automated driving in a state in which the destination is set by the destination setting unit;
  sets the automated driving state to a second automated driving state, in a case that the automated driving instruction unit has instructed the initiation of automated driving in a state in which the destination is not set by the destination setting unit; and
  causes the automated driving state to transition from the first automated driving state to the second automated driving state, in a case that a current travel position lies outside of the travel route during the travel control in the first automated driving state.

According to a second aspect of the present invention, the vehicle control device comprises:
  an automated driving instruction unit configured to instruct initiation of automated driving of a host vehicle by an operation of a vehicle occupant;
  a destination setting unit configured to set a destination by an operation of the vehicle occupant, together with generating a travel route to the destination in accordance with setting of the destination;
  a position specifying unit configured to specify a travel position of the host vehicle;
  an automated driving control unit configured to set an automated driving state, together with performing a travel control for the host vehicle in accordance with the automated driving state; and
  a notification unit configured to issue a notification to the vehicle occupant;
  wherein the automated driving control unit:
  sets the automated driving state to a first automated driving state, in a case that the automated driving instruction unit has instructed the initiation of automated driving in a state in which the destination is set by the destination setting unit;
  sets the automated driving state to a second automated driving state, in a case that the automated driving instruction unit has instructed the initiation of automated driving in a state in which the destination is not set by the destination setting unit; and
  performs a lane change control in the first automated driving state and the second automated driving state; and
  wherein the notification unit issues a first notification in a case that the lane change control is suspended in the first automated driving state, and issues a second notification that differs from the first notification in a case that the lane change control is suspended in the second automated driving state.

According to a third aspect of the present invention, the vehicle control device comprises:
  an automated driving instruction unit configured to instruct initiation of automated driving of a host vehicle by an operation of a vehicle occupant;
  a destination setting unit configured to set a destination by an operation of the vehicle occupant, together with generating a travel route to the destination in accordance with setting of the destination; and
  an automated driving control unit configured to set an automated driving state, together with performing a travel control for the host vehicle in accordance with the automated driving state;
  wherein the automated driving control unit:
  sets the automated driving state to a first automated driving state, in a case that the automated driving instruction unit has instructed the initiation of automated driving in a state in which the destination is set by the destination setting unit;

sets the automated driving state to a second automated driving state, in a case that the automated driving instruction unit has instructed the initiation of automated driving in a state in which the destination is not set by the destination setting unit; and prohibits a course changing operation by the first automated driving state, in a case that the destination is canceled or changed during the travel control in the first automated driving state.

According to the present invention, the load imposed on the vehicle occupant can be reduced.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 10 is a flowchart of a process performed in a second exemplary embodiment.

DESCRIPTION OF THE PREFERRED EMBODIMENTS

Preferred embodiments of a driving control device according to the present invention will be presented and described in detail below with reference to the accompanying drawings.

1. Overview of Vehicle Control Device 10

Figure 1:
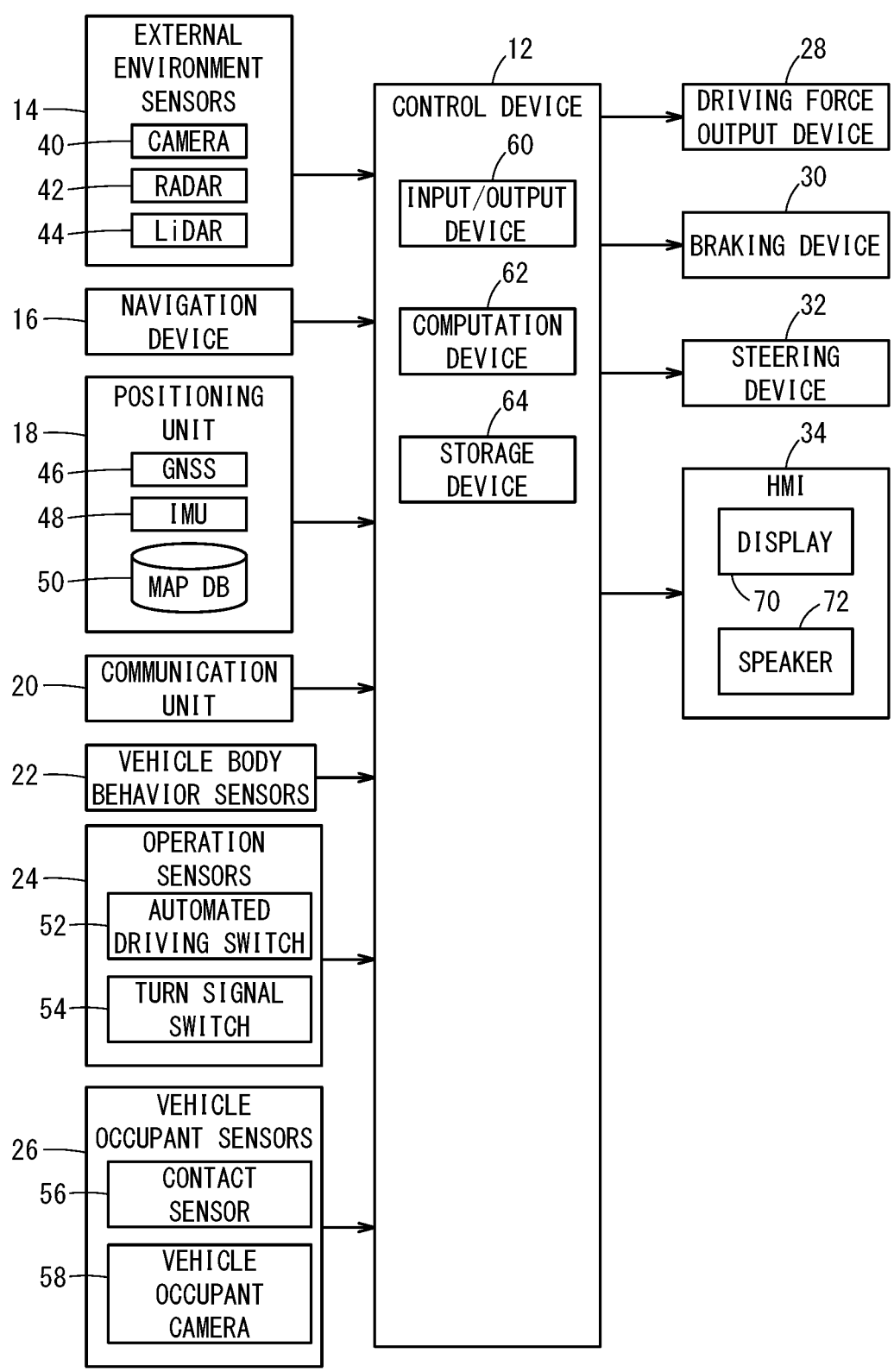
FIG. 1 is a block diagram of a vehicle control device according to a present embodiment.

The vehicle control device 10 shown in FIG. 1 is capable of performing all or a portion of the driving operations of a host vehicle (driver's own vehicle) 100 (see FIG. 4) on the basis of a set control state. The vehicle control device 10 is capable of setting a control state in which the host vehicle 100 is made to travel automatically, and more specifically, a control state (automated driving state) in which a driving force output control, a braking control, and a steering control are performed automatically. Furthermore, the vehicle control device 10 is capable of setting either one of a first automated driving state or a second automated driving state as the automated driving state. The first automated driving state is a driving mode in which the host vehicle 100 is made to travel to a destination along a preset travel route, and this mode is referred to as a destination guidance mode. The second automated driving state is a driving mode in which the host vehicle 100 is made to travel along the road, and this mode is referred to as a road following mode.

2. Configuration of Vehicle Control Device 10

The vehicle control device 10 will now be described with reference to FIG. 1. The vehicle control device 10 includes a control device 12, an input device group that inputs various information with respect to the control device 12, and an output device group that operates the host vehicle 100 based on various information output from the control device 12. Within the input device group, there are included external environment sensors 14, a navigation device 16, a positioning unit 18, a communication unit 20, vehicle body behavior sensors 22, operation sensors 24, and vehicle occupant sensors 26. Within the output device group, there are included a driving force output device 28, a braking device 30, a steering device 32, and an HMI 34.

2.1. Configuration of Input Device Group

The external environment sensors 14 include one or more cameras 40, one or more radar devices 42, and one or more LiDAR devices 44. The cameras 40 capture images of the surrounding environment of the host vehicle 100, and output image information to the control device 12. The radar devices 42 and the LiDAR devices 44 detect targets around the periphery of the host vehicle 100, and output detected information to the control device 12. The navigation device 16 specifies the position of the host vehicle 100 using a GPS or the like, generates a travel route 110 from the position of the host vehicle 100 to a destination designated by the vehicle occupant, and outputs travel route information to the control device 12. The positioning unit 18 outputs to the control device 12 position information indicative of the position of the host vehicle 100 specified by a GNSS 46 and an IMU 48, and map information stored in a map DB 50. Moreover, the map information of the map DB 50 is of higher accuracy than the map information of the navigation device 16, and further includes various information (such as information in lane units) that are not included within the map information of the navigation device 16. The communication unit 20 includes a communication device that receives information broadcast by a broadcasting station, a communication device that receives information transmitted by roadside devices installed along the road, and a communication device that receives information transmitted by vehicles other than the host vehicle, and outputs the various information that are received to the control device 12.

The vehicle body behavior sensors 22 include various sensors that measure the behavior (vehicle speed, yaw rate, etc.) of the host vehicle 100. The vehicle body behavior sensors 22 output various measured information to the control device 12. The operation sensors 24 include an automated driving switch 52, a turn signal switch 54, and various sensors (not shown) that measure the operated amounts of driving operation elements (the accelerator pedal, the brake pedal, the steering wheel). The automated driving switch 52 outputs to the control device 12 instruction information in accordance with switching operations performed by the vehicle occupant, for example, instruction information for execution/stoppage of automated driving, or alternatively, instruction information indicating control states of the host vehicle 100 during automated driving (see item [2.2] below). The turn signal switch 54 outputs information corresponding to operation of the turn signal lever to the control device 12. The information corresponding to operation of the turn signal lever is information indicative of the intention (execution of movement, stoppage of movement) of the vehicle occupant in relation to movement of the host vehicle 100 in a lateral direction. The vehicle occupant sensors 26 include a contact sensor 56 and a vehicle occupant camera 58. The contact sensor 56 is a capacitance sensor or a pressure sensor provided on the steering wheel. The contact sensor 56 detects the gripping state (contact state) of the vehicle occupant with respect to the steering wheel, and outputs the detected information to the control device 12. The vehicle occupant camera 58 is disposed in a manner of being directed toward the driver's seat. The vehicle occupant camera 58 captures images of the head (face) of the vehicle occupant, and outputs such image information to the control device 12.

2.2. Configuration of Control Device 12

The control device 12 is configured by an ECU. The control device 12 includes an input/output device 60, a computation device 62, and a storage device 64. The input/output device 60 includes an A/D conversion circuit, a communication interface, a driver, and the like. The computation device 62 is configured by a processor equipped with a CPU or the like, for example. The computation device 62 realizes various functions by executing programs stored in the storage device 64. A description will be given in item [2.4] below concerning the various functions of the computation device 62. The storage device 64 includes a RAM, a ROM, and the like. The storage device 64 stores various programs, and numerical information such as threshold values and the like that are used in processes performed by the computation device 62.

2.3. Configuration of Output Device Group

The driving force output device 28 includes a driving force output ECU and actuators (including a driving motor, a throttle valve, and the like) that serve as control targets of the driving force output ECU. The driving force output device 28 adjusts the driving force in accordance with an operation of the accelerator pedal performed by the vehicle occupant, or instruction information (driving instructions) output from the control device 12.

The braking device 30 includes a brake ECU, and actuators (including a brake actuator and the like) that serve as control targets of the brake ECU. The braking device 30 adjusts the braking force in accordance with an operation of the brake pedal performed by the vehicle occupant, or instruction information (braking instructions) output from the control device 12.

The steering device 32 includes an electric power steering (EPS) ECU and an actuator (including an EPS actuator or the like) that is controlled by the EPS ECU. The steering device 32 adjusts the steering amount in accordance with operations of the steering wheel performed by the vehicle occupant, or instruction information (steering instructions) output from the control device 12.

A display 70 and a speaker 72 are included in the HMI 34. The display 70 outputs image information in accordance with instruction information (notification instructions) output from the control device 12. The speaker 72 outputs sound or voice information in accordance with the instruction information (notification instructions) output from the control device 12.

2.4. Various Functions of Computation Device 62

Figure 2:
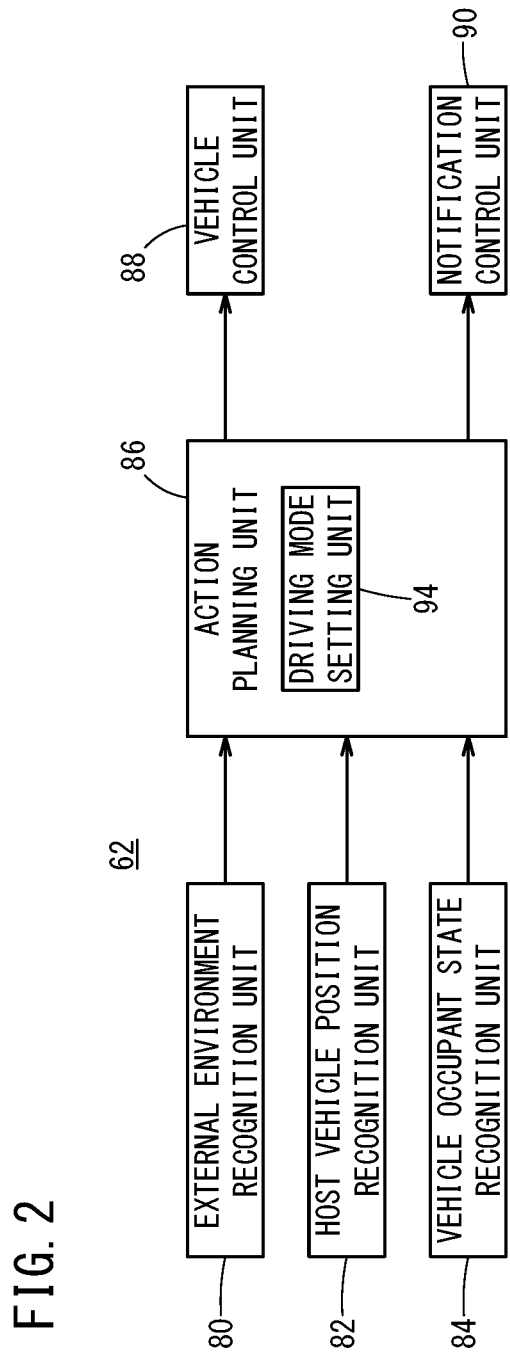
FIG. 2 is a functional block diagram of a computation device.

The various functions realized by the computation device 62 will be described with reference to FIG. 2. The computation device 62 functions as an external environment recognition unit 80, a host vehicle position recognition unit 82, a vehicle occupant state recognition unit 84, an action planning unit 86, a vehicle control unit 88, and a notification control unit 90.

The external environment recognition unit 80 recognizes the state occurring around the periphery of the host vehicle 100 on the basis of the image information and the detected information output from the external environment sensors 14. The host vehicle position recognition unit 82 recognizes the position of the host vehicle 100 on the basis of the map information and the position information output from the positioning unit 18. The vehicle occupant state recognition unit 84 recognizes the gripping state of the vehicle occupant (whether or not there is contact made) with respect to the steering wheel on the basis of the detected information output from the contact sensor 56. Further, the vehicle occupant state recognition unit 84 recognizes the occupant's surrounding monitoring state of the vehicle occupant (whether or not the vehicle occupant is looking forward, or whether or not the eyes are open) on the basis of the image information output from the vehicle occupant camera 58.

The action planning unit 86 generates a local map (dynamic map) which includes static information and dynamic information around the periphery of the host vehicle 100 on the basis of the recognition results of the external environment recognition unit 80 and the host vehicle position recognition unit 82. In addition, the action planning unit 86 determines optimal actions based on the local map and the state (vehicle speed, steering angle, position) of the host vehicle 100, and calculates a travel speed (or acceleration/deceleration) together with generating a travel trajectory in order to realize such actions.

In the case that automated driving is initiated by the automated driving switch 52, the action planning unit 86 also functions as a driving mode setting unit 94, which sets the automated driving state to the destination guidance mode or the road following mode depending on the situation. The driving mode setting unit 94 temporarily stores the most recent driving mode in the storage device 64. The action planning unit 86 determines whether the most recent driving mode that is stored in the storage device 64 is the currently set driving mode, and causes the output device group to execute controls within ranges allowed by the driving mode.

The vehicle control unit 88 calculates an acceleration or deceleration in order for the host vehicle 100 to be operated at the travel speed calculated by the action planning unit 86, and a steering angle for causing the host vehicle 100 to travel along the travel trajectory generated by the action planning unit 86. Moreover, in the case that the acceleration/deceleration is calculated by the action planning unit 86, it is unnecessary for the acceleration/deceleration to be calculated by the vehicle control unit 88. The vehicle control unit 88 outputs instruction information to instruct the acceleration/deceleration and the steering angle to the driving force output device 28, the braking device 30, and the steering device 32 via the input/output device 60. The notification control unit 90 outputs instruction information indicative of notification content to the HMI 34 via the input/output device 60, in the case that notifications are required in accordance with the actions determined by the action planning unit 86.

3. First Exemplary Embodiment

3.1. Automated Driving Initiation Process

Figure 3:
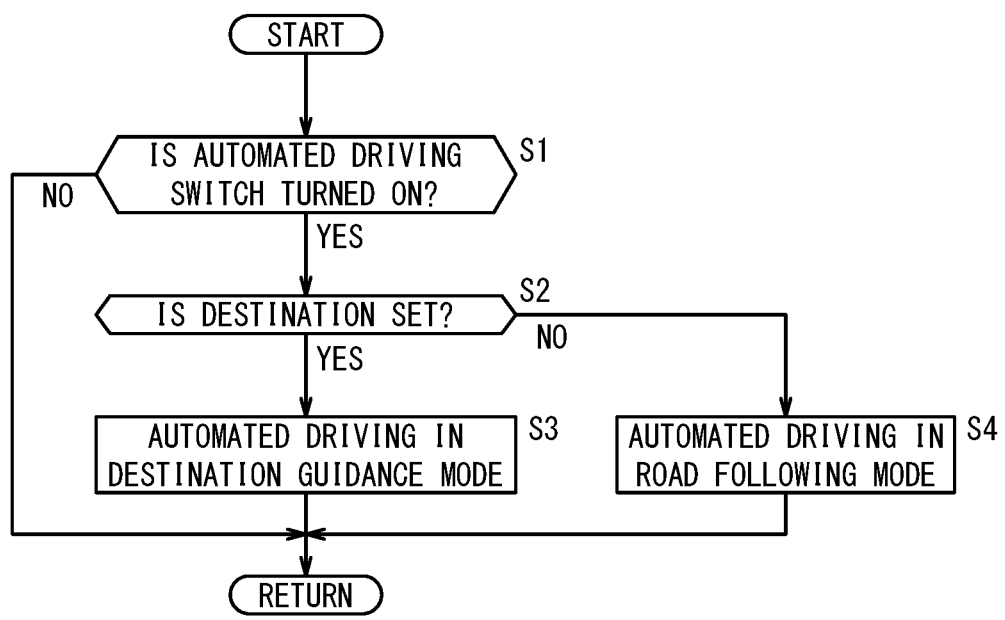
FIG. 3 is a flowchart of an automated driving initiation process performed in a first exemplary embodiment.

A description will be given with reference to FIG. 3 concerning a process performed in the first embodiment. The process shown in FIG. 3 is carried out at each of predetermined time periods, in the case that the vehicle control device 10 is not in an automated driving state in which all of the driving force output control, the braking control, and the steering control are performed, or stated otherwise, in the case that automated driving has not been initiated. Further, in each of the processes to be described below, the input device group, which was described in the aforementioned item [2.1], periodically acquires respective items of information. Further, the external environment recognition unit 80, the host vehicle position recognition unit 82, and the vehicle occupant state recognition unit 84 periodically carry out recognition processes.

In step S1, based on the instruction information output from the automated driving switch 52, the driving mode setting unit 94 determines whether or not the automated driving switch 52 has been turned on. In the case that the automated driving switch 52 has been turned on (step S1: YES), the process proceeds to step S2. On the other hand, in the case that the automated driving switch 52 has not been turned on (step S1: NO), the process is temporarily terminated.

In step S2, the driving mode setting unit 94 determines whether or not a destination has been set in the navigation device 16. In the case that the destination is set (step S2: YES), the process proceeds to step S3. On the other hand, in the case that the destination is not set (step S2: NO), the process proceeds to step S4.

In step S3, the driving mode setting unit 94 sets a first driving state, and more specifically, sets the destination guidance mode as the automated driving state. At this time, the driving mode setting unit 94 causes the destination guidance mode to be stored as the current driving mode in the storage device 64. The action planning unit 86 and the vehicle control unit 88 carry out automated driving in accordance with the destination guidance mode.

In step S4, the driving mode setting unit 94 sets a second driving state, and more specifically, sets the road following mode as the automated driving state. At this time, the driving mode setting unit 94 causes the road following mode to be stored as the current driving mode in the storage device 64. The action planning unit 86 carries out automated driving in accordance with the road following mode.

3.2. Travel Lane 114 Set During Automated Driving

Figure 4:
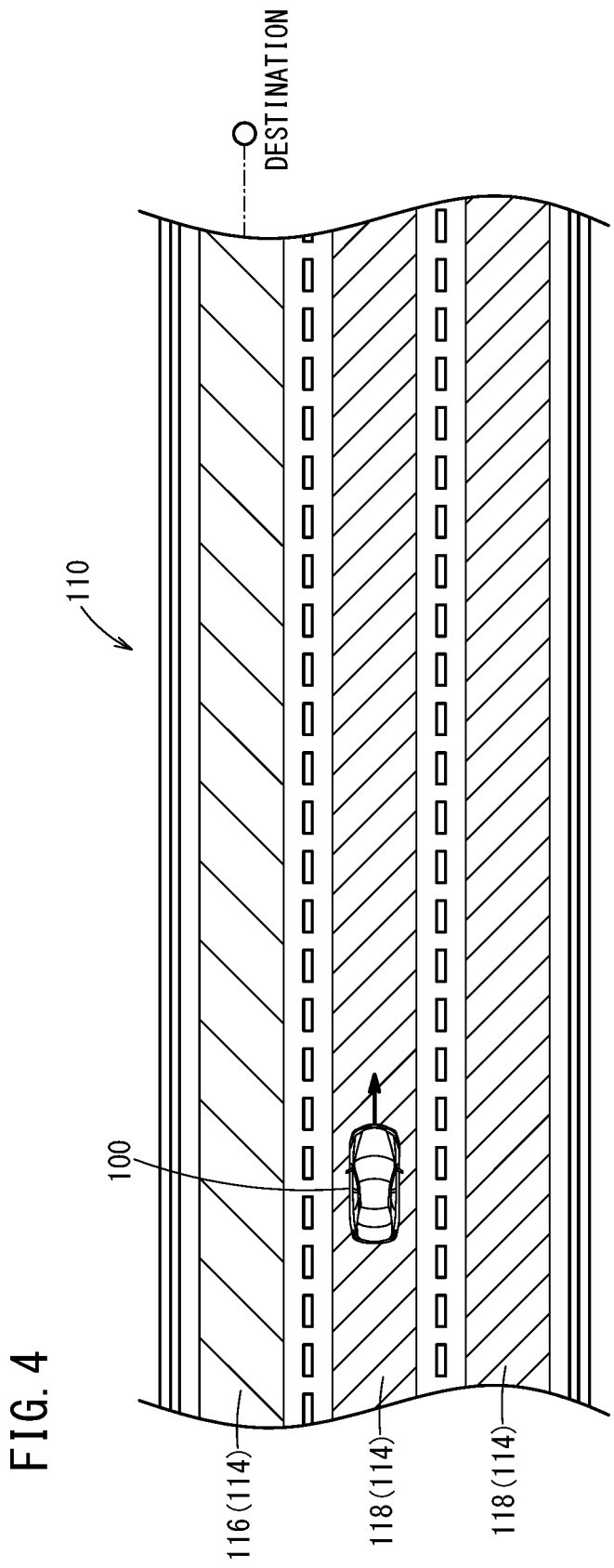
FIG. 4 is an explanatory diagram for describing a travel route.

As shown in FIG. 4, in the destination guidance mode, a recommended lane 116 and an alternative lane 118 are set on the travel route 110. In the case of traveling in the destination guidance mode, the action planning unit 86 acquires the travel route information from the navigation device 16, together with the map information from the map DB 50 of the positioning unit 18. The action planning unit 86 acquires information of the travel lane 114 included within the travel route 110 based on the map information, and sets the recommended lane 116 and the alternative lane 118. The recommended lane 116 refers to a travel lane 114 included within the route having the shortest travel distance to the destination. The recommended lane 116 refers to a travel lane 114 in which the number of lane changes is minimized, from among the travel lanes 114 that can be traveled in order to reach the destination. In the case that the destination is not set, the action planning unit 86 sets as the recommended lane 116 a travel lane 114 at an extreme end (a left end in the case of left-hand traffic, or a right end in the case of right-hand traffic). On the other hand, the alternative lane 118 refers to a travel lane 114 lying adjacent to the recommended lane 116.

The action planning unit 86 generates the travel trajectory on the assumption that the host vehicle 100, when in the destination guidance mode, is made to travel in the recommended lane 116. However, in the case of overtaking a low-speed forward traveling vehicle, or in the case that the vehicle occupant operates the turn signal switch 54 or the like in order to instruct a lane change, the action planning unit 86 generates a travel trajectory to allow traveling in the alternative lane 118. However, even if the destination guidance mode is set, there are cases in which the host vehicle 100 does not travel in the recommended lane 116 or the alternative lane 118, depending on the intention of the vehicle occupant or the surrounding situation or the like. In such a case, the action planning unit 86 changes the driving mode, or terminates automated driving.

When the host vehicle 100 is traveling in the alternative lane 118 in the destination guidance mode, the alternative lane 118 may come to an end or disappear. For example, in the case that the recommended lane 116 joins with a one-lane road (for example, a branching road or the like) on one side, or in the case that the lane itself vanishes accompanying a decrease in the number of lanes, the alternative lane 118 that was set disappears. In such a case, the action planning unit 86 changes the lane beforehand from the alternative lane 118 into the recommended lane 116.

3.3. Processing Performed when Destination Guidance Mode is Set

Figure 5:
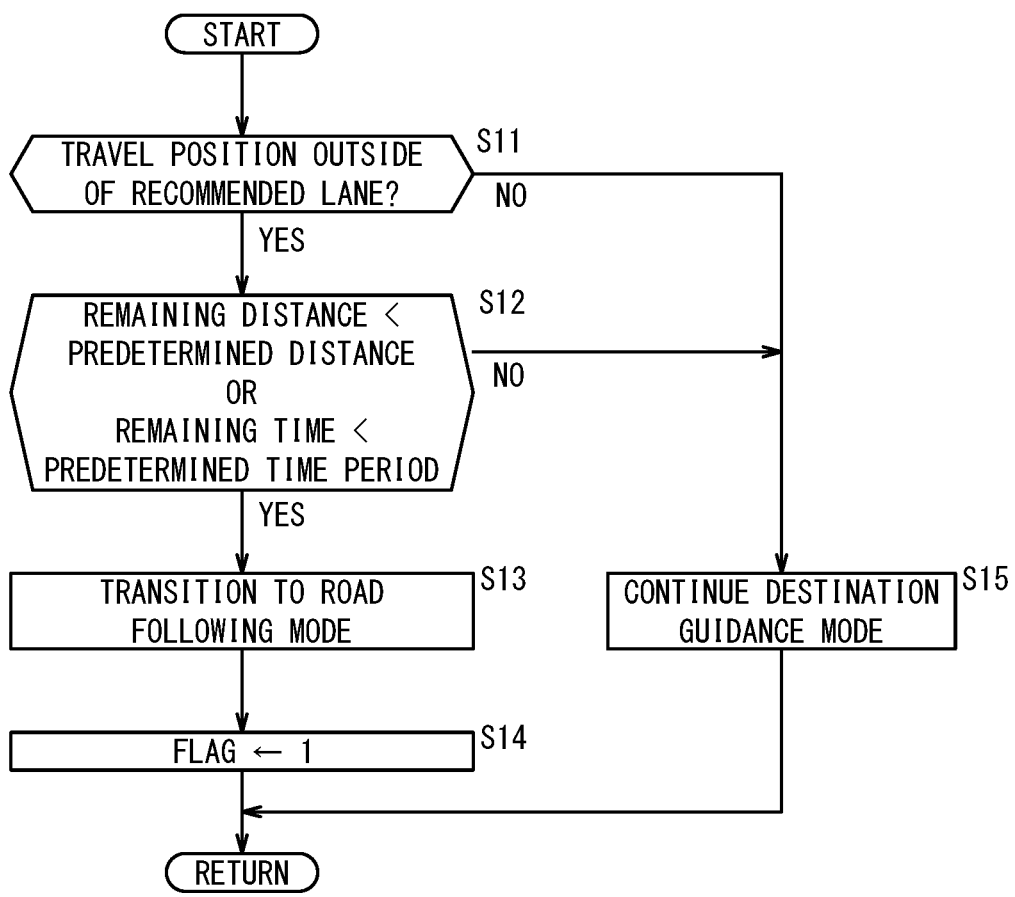
FIG. 5 is a flowchart of a process performed in a destination guidance mode.

A description will be given with reference to FIG. 5 concerning a process performed in the case that the destination guidance mode is set. In the case that the destination guidance mode is set, the process shown in FIG. 5 is performed at each of predetermined time periods.

In step S11, the action planning unit 86 determines whether or not the travel position of the host vehicle 100 recognized by the host vehicle position recognition unit 82 lies outside of the recommended lane 116. In the case that the travel position lies outside of the recommended lane 116 (step S11: YES), the process proceeds to step S12. At a time of overtaking another vehicle or the like, the action planning unit 86 may temporarily generate a travel trajectory that lies outside of the recommended lane 116.

In such a case, the action planning unit 86 does not determine that the travel position lies outside of the recommended lane 116. On the other hand, in the case that the travel position lies inside of the recommended lane 116 (step S11: NO), the process proceeds to step S15.

In step S12, the action planning unit 86 estimates the remaining distance from the travel position of the host vehicle 100 to a branching point in an advancing direction, and compares the remaining distance with a predetermined distance. Alternatively, the action planning unit 86 may estimate the remaining time until reaching the branching point from the travel position in the advancing direction of the host vehicle 100, and may compare the remaining time with a predetermined time period. The predetermined distance is a distance from the branching point to the limit point of an automatic lane change as directed by the system. The predetermined time period is a time period required for the automatic lane change as directed by the system. The predetermined distance and the predetermined time period may be calculated on the basis of the map information of the navigation device 16 or the map information of the map DB 50, and may be stored in advance in the storage device 64. In the case that the remaining distance is less than the predetermined distance (remaining distance<predetermined distance), or alternatively, in the case that the remaining time is less than the predetermined time period (remaining time<predetermined time period) (step S12: YES), the process proceeds to step S13. On the other hand, in the case that the remaining distance is greater than or equal to the predetermined distance (remaining distance predetermined distance), or alternatively, in the case that the remaining time is greater than or equal to the predetermined time period (remaining time predetermined time period) (step S12: NO), the process proceeds to step S15.

Figure 6:
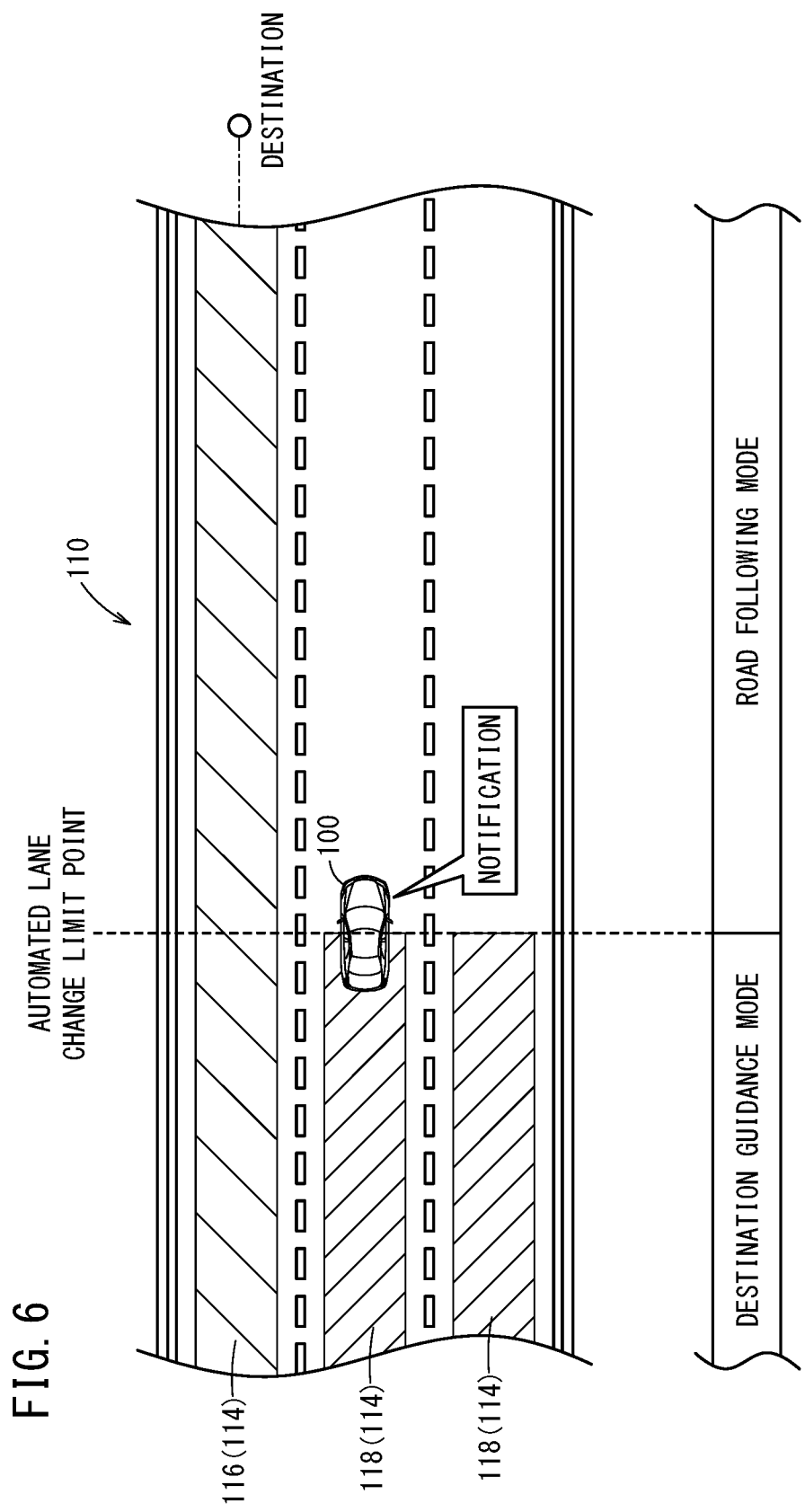
FIG. 6 is an explanatory diagram for describing a transition state from the destination guidance mode to a road following mode.

In step S13, the driving mode setting unit 94 determines that it is difficult for the host vehicle 100 to automatically make a lane change and move into the recommended lane 116 before reaching the branching point, and determines it is difficult to maintain the destination guidance mode. In this case, the driving mode setting unit 94 causes the automated driving state to transition from the destination guidance mode to the road following mode (see FIG. 6). At this time, the driving mode setting unit 94 causes the road following mode to be stored as the current driving mode in the storage device 64. Furthermore, the notification control unit 90 outputs instruction information to the HMI 34 (the display 70 and the speaker 72). The HMI 34 issues a notification with respect to the vehicle occupant that the destination guidance mode has been changed to the road following mode. The process then proceeds to step S14.

In step S14, the driving mode setting unit 94 sets a flag to 1. The condition of flag=1 indicates that the automated driving state has transitioned from the first automated driving state (destination guidance mode) to the second automated driving state (road following mode). In this case, the process proceeds to step S21 shown in FIG. 7.

On the other hand, in step S15, because there is no need to make an automatic lane change, the driving mode setting unit 94 continues in the first driving state, namely, the destination guidance mode.

3.4. Processing Performed when Road Following Mode is Set

Figure 7:
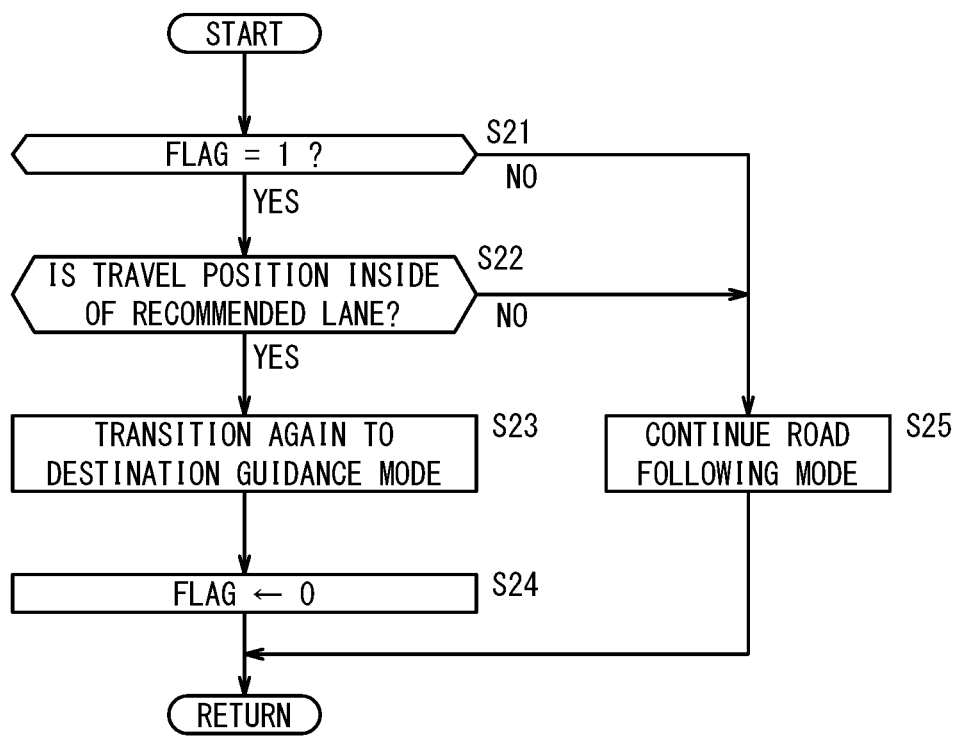
FIG. 7 is a flowchart of a process performed in the road following mode.

A description will be given with reference to FIG. 7 concerning a process performed in the case that the road following mode is set. After having transitioned from the destination guidance mode to the road following mode, the process shown in FIG. 7 is performed at each of predetermined time periods.

In step S21, the action planning unit 86 determines whether or not the flag has been set to 1. In the case that the flag is set to 1 (step S21: YES), the process proceeds to step S22. On the other hand, in the case that the flag is not set to 1 (step S21: NO), the process proceeds to step S25.

In step S22, the action planning unit 86 determines whether or not the travel position of the host vehicle 100 recognized by the host vehicle position recognition unit 82 lies inside of the recommended lane 116. When the action planning unit 86 causes a transition in the automated driving state from the destination guidance mode to the road following mode (step S13 in FIG. 5), the information of the recommended lane 116 that was set in the destination guidance mode is temporarily stored in the storage device 64. In this instance, the action planning unit 86 determines whether or not the travel position of the host vehicle 100 lies inside of the recommended lane 116 that is stored in the storage device 64. Alternatively, in the case that the navigation device 16 generates the travel route 110 again, the action planning unit 86 resets the recommended lane 116, and based thereon, determines whether or not the travel position of the host vehicle 100 lies inside of the reset recommended lane 116. In the case that the travel position lies inside of the recommended lane 116 (step S22: YES), the process proceeds to step S23. On the other hand, in the case that the travel position lies outside of the recommended lane 116 (step S22: NO), the process proceeds to step S25.

Figure 8:
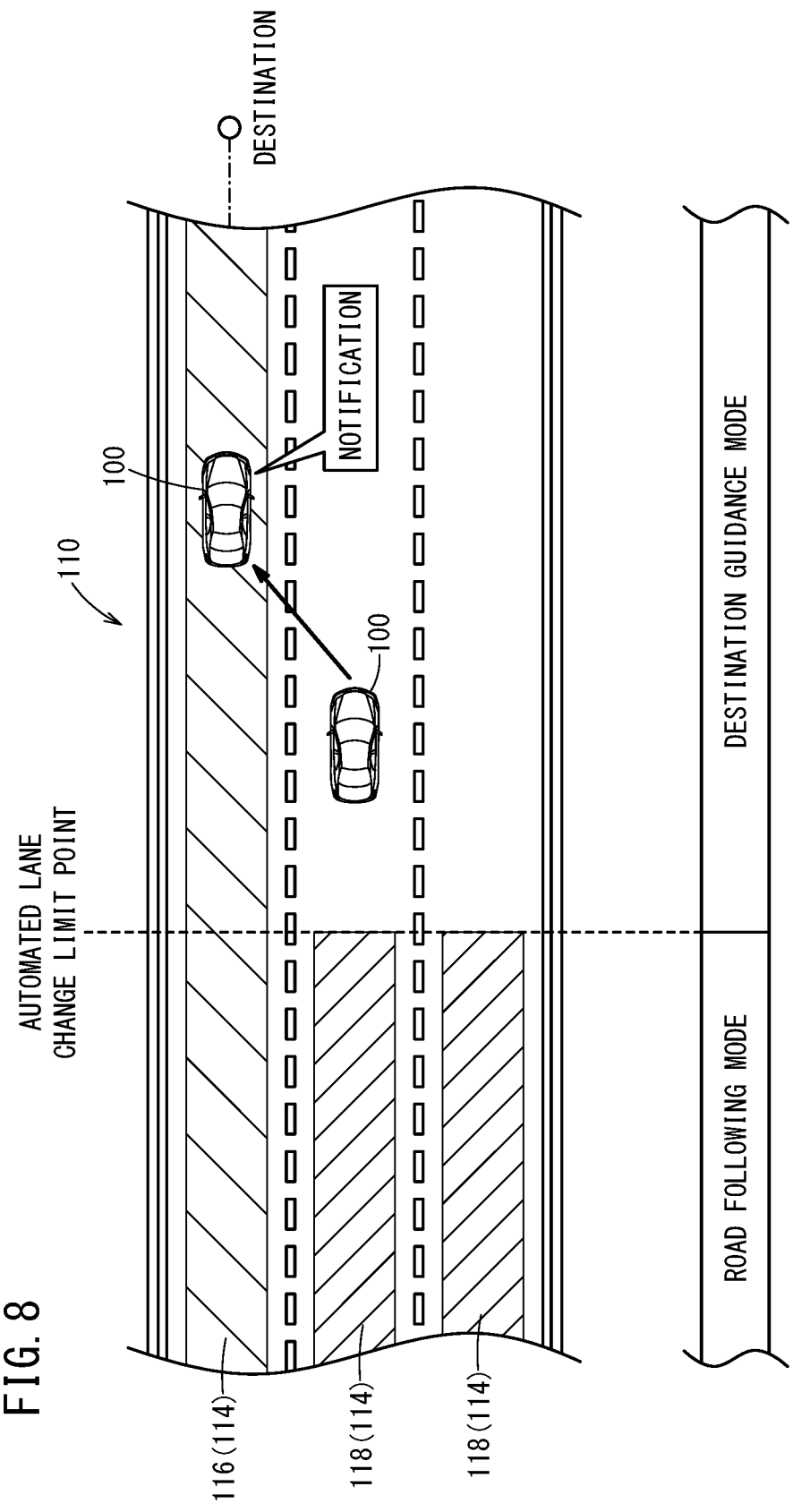
FIG. 8 is an explanatory diagram for describing a transition state from the road following mode to the destination guidance mode.

In step S23, the driving mode setting unit 94 determines that it is possible to travel to the destination in the current travel lane 114, and causes the automated driving state to transition again from the road following mode to the destination guidance mode (see FIG. 8). At this time, the driving mode setting unit 94 causes the destination guidance mode to be stored as the current driving mode in the storage device 64. Furthermore, the notification control unit 90 outputs instruction information to the HMI 34 (the display 70 and the speaker 72). The HMI 34 issues a notification with respect to the vehicle occupant that the road traveling mode has been changed to the destination guidance mode. The process then proceeds to step S24.

In step S24, the driving mode setting unit 94 sets the flag to 0. In this case, the process proceeds to step S11 shown in FIG. 5.

On the other hand, in step S25, due to the fact that the destination is not set from the beginning, or alternatively, since transitioning to the destination guidance mode is impossible, the driving mode setting unit 94 continues in the second operation state, namely, the road following mode.

3.5. Modified Examples

The above-described embodiments can be modified in various ways by replacing a portion of the functions or adding additional functions thereto. A portion of such modifications will be described below.

In the case that the destination is deleted or changed during the lane change control, the action planning unit 86 determines whether to stop or continue the lane change control based on the degree of progress of the lane change.

Figure 9:
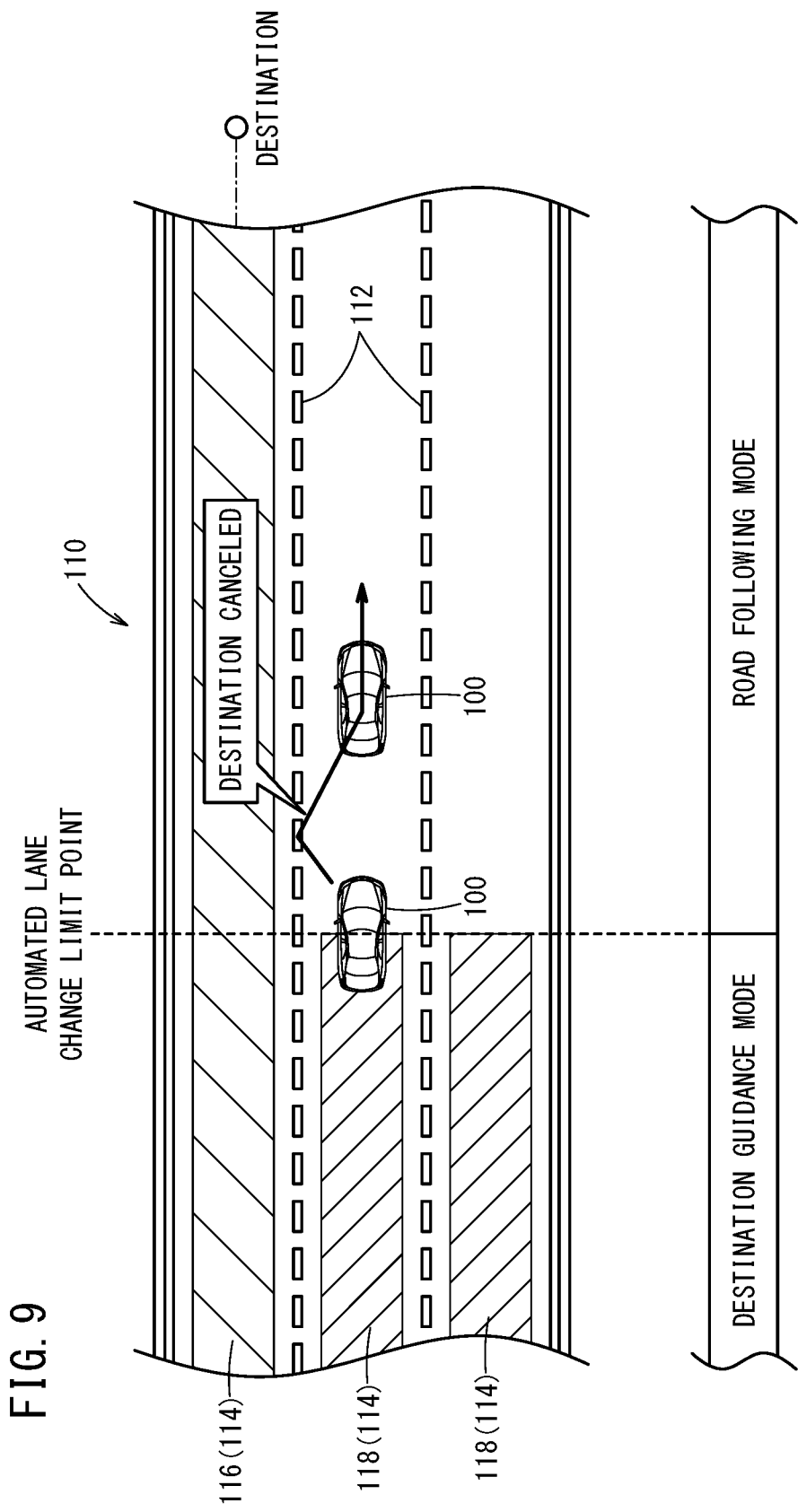
FIG. 9 is an explanatory diagram for describing a modified example.

As shown in FIG. 9, when the destination is deleted or changed during the lane change control from the alternative lane 118 into the recommended lane 116, the meaning of the lane change control that is currently being executed is lost. In such a case, the action planning unit 86 determines whether to stop or continue the lane change control, on the basis of a relative position between the vehicle wheels of the host vehicle 100 and the lane markings 112. In the case that the front wheel in the direction of the lane change has arrived at the lane marking 112, the action planning unit 86 determines that the lane change should be continued. In the case that the front wheel in the direction of the lane change has not arrived at the lane marking 112, the action planning unit 86 determines that the lane change should be canceled.

4. Second Exemplary Embodiment

In the case that the vehicle control device 10 automatically performs a lane change, there are cases in which the vehicle occupant (driver) may terminate the lane change by operating the turn signal switch 54, the steering wheel, or the like. Further, cases occur in which the vehicle control device 10 may be forced to stop performing the lane change due to external factors. In the second embodiment, when the lane change is terminated, the manner in which a notification is issued to the vehicle occupant is changed in accordance with the driving mode that is set at that time.

A description will be given with reference to FIG. 10 concerning a process performed in the second exemplary embodiment. The process shown in FIG. 10 is carried out at each of predetermined time periods, in the case that the vehicle control device 10 is in an automated driving state in which all of the driving force output control, the braking control, and the steering control are performed, or stated otherwise, in the case that automated driving has been initiated. Further, in each of the processes to be described below, the input device group, which was described in the aforementioned item [2.1], periodically acquires respective items of information. Further, the external environment recognition unit 80, the host vehicle position recognition unit 82, and the vehicle occupant state recognition unit 84 periodically carry out recognition processes.

In step S31, the action planning unit 86 determines whether or not the lane change has been suspended after steering is initiated in accordance with the lane change control. In the case of having been suspended (step S31: YES), the process proceeds to step S32. On the other hand, in the case of not being suspended (step S31: NO), the process is temporarily terminated.

In step S32, the driving mode setting unit 94 determines the driving mode that is set at that time. In the case that the driving mode is the destination guidance mode (step S32: destination guidance mode), the process proceeds to step S33. On the other hand, in the case that the driving mode is the road following mode (step S32: road following mode), the process proceeds to step S34.

In step S33, the notification control unit 90 outputs instruction information to the HMI 34. The HMI 34 issues a notification corresponding to the destination guidance mode. For example, a notification such as "terminate destination guidance" or the like is issued. In the case of being combined with the first embodiment, a notification such as "change to the road following mode" or the like can also be issued.

In step S34, the notification control unit 90 outputs instruction information with respect to the HMI 34. The HMI 34 issues a notification corresponding to the road following mode. For example, a notification such as "cannot change lanes" is issued.

5. Third Exemplary Embodiment

An additional exemplary embodiment in relation to the first exemplary embodiment and the second exemplary embodiment will be described. When the vehicle control device 10 is performing the travel control in the destination guidance mode, there are cases in which the vehicle occupant may operate the navigation device 16 in order to delete or change the destination. In such a case, the action planning unit 86 may prohibit an operation to change lanes that is automatically performed in the destination guidance mode.

Ordinarily, in the case that the recommended lane 116 is changed from the current travel lane 114 to another travel lane 114, the action planning unit 86 generates a travel trajectory for the purpose of changing lanes, and the vehicle control unit 88 causes various devices to carry out the lane change operation on the basis of the travel trajectory. In contrast thereto, in the case that the vehicle occupant operates the navigation device 16 in order to delete the destination, the driving mode setting unit 94 causes the automated driving state to transition from the destination guidance mode to the road following mode. At this time, the host vehicle 100 maintains the travel lane 114 in which the vehicle is traveling at the present time.

6. Technical Concepts Obtained from the Embodiments

A description will be given below concerning technical concepts that can be grasped from the above-described embodiments and the modified examples.

According to the first aspect of the present invention, the vehicle control device is equipped with:

the automated driving instruction unit (automated driving switch 52) configured to instruct initiation of automated driving of the host vehicle 100 by an operation of the vehicle occupant;

the destination setting unit (navigation device 16) configured to set the destination by an operation of the vehicle occupant, together with generating the travel route 110 (recommended lane 116, alternative lane 118) to the destination in accordance with setting of the destination;

the position specifying unit (positioning unit 18) configured to specify the travel position of the host vehicle 100; and the automated driving control unit (computation device 62) configured to set the automated driving state, together with performing the travel control for the host vehicle 100 in accordance with the automated driving state;

wherein the automated driving control unit:

sets the automated driving state to the first automated driving state (destination guidance mode) (step S3), in the case that the automated driving instruction unit has instructed the initiation of automated driving in a state in which the destination is set by the destination setting unit;

sets the automated driving state to the second automated driving state (road following mode) (step S4), in the case that the automated driving instruction unit has instructed the initiation of automated driving in a state in which the destination is not set by the destination setting unit; and causes the automated driving state to transition from the first automated driving state to the second automated driving state (step S13), in the case that the current travel position lies outside of the travel route 110 during the travel control in the first automated driving state.

In accordance with the above-described configuration, an appropriate mode can be set depending on the presence or absence of the destination. Further, even if it becomes impossible to continue the first automated driving state (destination guidance mode), since a transition is made to the second automated driving state (road following mode), automated driving can be continued without being canceled. Therefore, the load imposed on the vehicle occupant is reduced, in comparison with a case in which automated driving is canceled. Further, the host vehicle 100 can be made to travel according to the wishes of the vehicle occupant who has set the automated driving state.

In the above described embodiment, after the automated driving state has transitioned from the first automated driving state (destination guidance mode) to the second automated driving state (road following mode), the destination setting unit (navigation device 16, action planning unit 86) may generate a new travel route 110 to the destination, and in the case that the current travel position lies inside of the new travel route 110, the automated driving control unit (computation device 62) may cause the automated driving state to transition from the second automated driving state to the first automated driving state.

In accordance with the above-described configuration, since a transition is made from the second automated driving state (road following mode) to the first automated driving state (destination guidance mode), automated driving can continue to be carried out appropriately, and the load imposed on the vehicle occupant can be further reduced.

In the above-described embodiment, the notification unit (HMI 34) may be further provided, and configured to issue a notification to the vehicle occupant that the automated driving state will be changed when the automated driving state transitions.

In accordance with the above-described configuration, it is possible to appropriately notify the driver that the driving mode has been changed.

In the above-described embodiment, the automated driving control unit (computation device 62) may set the recommended lane 116 in the travel route 110 in which one or more travel lanes 114 are included, may determine whether or not the host vehicle 100 is traveling in the recommended lane 116 (step S11), in the case that the host vehicle 100 is traveling outside of the recommended lane 116, may cause the automated driving state to transition from the first automated driving state (destination guidance mode) to the second automated driving state (road following mode) (step S13), and in the case that the lane change control into the recommended lane 116 is performed in the second automated driving state, may cause the automated driving state to transition to the first automated driving state (step S23).

In accordance with the above-described configuration, since a transition is made from the second automated driving state (road following mode) to the first automated driving state (destination guidance mode), automated driving can continue to be carried out appropriately, and the load imposed on the vehicle occupant can be further reduced.

In the above-described embodiment, the automated driving control unit (computation device 62) may set the recommended lane 116 in the travel route 110 in which one or more travel lanes 114 are included, may determine whether or not the host vehicle 100 is traveling in the recommended lane 116 (step S11), may estimate the remaining distance from the travel position to a branching point of the recommended lane 116, or a remaining time from the travel position to the branching point (step S12), in the case that the remaining distance is longer than a predetermined distance, or in the case that the remaining time is longer than a predetermined time period, and in the case that the host vehicle 100 is traveling outside of the recommended lane 116, may maintain the automated driving state in the first automated driving state (destination guidance mode) (step S15), and in the case that the remaining distance is shorter than the predetermined distance, or in the case that the remaining time is shorter than the predetermined time period, and in the case that the host vehicle 100 is traveling outside of the recommended lane 116, may cause the automated driving state to transition from the first automated driving state to the second automated driving state (road following mode) (step S13).

In accordance with the above-described configuration, in the case that the branching point is far away, the first automated driving state (destination guidance mode) is maintained even if the current travel position lies outside of the recommended lane 116, whereas in the case that the branching point is near, since a transition is made to the road following mode, automated driving can be continued while allowing the lane change to be performed by the vehicle occupant.

In the above-described embodiment, the automated driving control unit (computation device 62) may set the recommended lane 116 in the travel route 110 in which one or more travel lanes 114 are included, may determine whether or not the host vehicle 100 is traveling in the recommended lane 116, in the case that the host vehicle 100 is traveling outside of the recommended lane 116, may perform the lane change control into the recommended lane 116, and in the case that the destination is deleted or changed during the lane change control, may determine whether to stop or continue the lane change control based on a degree of progress of the lane change (modified example).

In accordance with the above-described configuration, the lane change can be canceled when triggered by the destination being deleted or changed while making a lane change into the recommended lane 116, and a system-directed automatic lane change which is not intended by the vehicle occupant can be canceled. On the other hand, in the case that the lane change is being executed to a certain extent, by allowing the lane change to continue without modification, there is no need for the host vehicle 100 to return to the travel lane 114 before the lane change is completed.

According to the second aspect of the present invention, the vehicle control device is equipped with:
  the automated driving instruction unit (automated driving switch 52) configured to instruct initiation of automated driving of the host vehicle 100 by an operation of the vehicle occupant;
  the destination setting unit (navigation device 16) configured to set the destination by an operation of the vehicle occupant, together with generating the travel route 110 to the destination in accordance with setting of the destination;
  the position specifying unit (positioning unit 18) configured to specify the travel position of the host vehicle 100;
  the automated driving control unit (computation device 62) configured to set the automated driving state, together with performing the travel control for the host vehicle in accordance with the automated driving state; and
  the notification unit (HMI 34) configured to issue a notification to the vehicle occupant;
  wherein the automated driving control unit:
  sets the automated driving state to the first automated driving state (destination guidance mode), in the case that the automated driving instruction unit has instructed the initiation of automated driving in a state in which the destination is set by the destination setting unit;
  sets the automated driving state to the second automated driving state (road following mode), in the case that the automated driving instruction unit has instructed the initiation of automated driving in a state in which the destination is not set by the destination setting unit; and performs the lane change control in the first automated driving state and the second automated driving state; and wherein the notification unit:

issues a first notification in the case that the lane change control is suspended in the first automated driving state, and issues a second notification that differs from the first notification in the case that the lane change control is suspended in the second automated driving state.

In accordance with the above-described configuration, since an appropriate notification is performed, the vehicle occupant can accurately grasp the automated driving state, and the burden on the vehicle occupant is reduced.

According to the third aspect of the present invention, the vehicle control device is equipped with:

the automated driving instruction unit (automated driving switch 52) configured to instruct initiation of automated driving of the host vehicle 100 by an operation of the vehicle occupant;

the destination setting unit (navigation device 16) configured to set the destination by an operation of the vehicle occupant, together with generating the travel route to the destination in accordance with setting of the destination; and the automated driving control unit (computation device 62) configured to set the automated driving state, together with performing the travel control for the host vehicle 100 in accordance with the automated driving state;

wherein the automated driving control unit:

sets the automated driving state to the first automated driving state (destination guidance mode), in the case that the automated driving instruction unit has instructed the initiation of automated driving in a state in which the destination is set by the destination setting unit;

sets the automated driving state to the second automated driving state (road following mode), in the case that the automated driving instruction unit has instructed the initiation of automated driving in a state in which the destination is not set by the destination setting unit; and prohibits a course changing operation by the first automated driving state, in the case that the destination is canceled or changed during the travel control in the first automated driving state.

In accordance with the above-described configuration, for example, since a course change (lane change) is prohibited based on a destination deletion operation performed by the vehicle occupant, the operation of the vehicle occupant can be reflected in the automated driving system at an early stage. Further, in such a configuration in which the navigation device 16 is independent, it is possible to augment the operation method for canceling the lane change.

The vehicle control device according to the present invention is not limited to the embodiments described above, and it is a matter of course that various modified or additional configurations could be adopted therein without deviating from the essence and gist of the present

What is claimed is:

1. A vehicle control device, comprising one or more processors that execute computer-executable instructions stored in a memory, wherein the one or more processors execute the computer-executable instructions to cause the vehicle control device to:

instruct initiation of automated driving of a host vehicle by an operation of a vehicle occupant;

set a destination by an operation of the vehicle occupant, together with generating a travel route, including one or more travel lanes, to the destination in accordance with setting of the destination;

specify a travel position of the host vehicle;

set an automated driving state, together with performing a travel control for the host vehicle in accordance with the automated driving state;

set the automated driving state to a first automated driving state in which the host vehicle is made to travel by the automated driving to the destination, in a case that the initiation of automated driving is instructed in a state in which the destination has been set; and set the automated driving state to a second automated driving state in which the host vehicle is made to travel by the automated driving along a road, in a case that the initiation of automated driving is instructed in a state in which the destination has not been set wherein in a case that a current travel position lies outside of a recommended lane included in the one or more travel lanes during the travel control in the first automated driving state, the one or more processors cause the vehicle control device to transition the automated driving state from the first automated driving state to the second automated driving state.

2. The vehicle control device according to claim 1, wherein:

after the automated driving state has transitioned from the first automated driving state to the second automated driving state, the one or more processors cause the vehicle control device to generate a new travel route to the destination; and in a case that the current travel position lies inside of a new recommended lane included in the new travel route, the one or more processors cause the vehicle control device to cause the automated driving state to transition from the second automated driving state to the first automated driving state.

3. The vehicle control device according to claim 1, wherein the one or more processors cause the vehicle control device to issue a notification to the vehicle occupant that the automated driving state will be changed when the automated driving state transitions.

4. The vehicle control device according to claim 1, wherein the one or more processors cause the vehicle control device to:

set the recommended lane in the travel route in which the one or more travel lanes are included;

determine whether or not the host vehicle is traveling in the recommended lane;

in a case that the host vehicle is traveling outside of the recommended lane, cause the automated driving state to transition from the first automated driving state to the second automated driving state; and in a case that a lane change control into the recommended lane is performed in the second automated driving state, cause the automated driving state to transition to the first automated driving state.

5. The vehicle control device according to claim 1, wherein the one or more processors cause the vehicle control device to:

set the recommended lane in the travel route in which the one or more travel lanes are included;

determine whether or not the host vehicle is traveling in the recommended lane;

estimate a remaining distance from the travel position to a branching point of the recommended lane, or a remaining time from the travel position to the branching point;

in a case that the remaining distance is longer than a predetermined distance, or in a case that the remaining time is longer than a predetermined time period, and in a case that the host vehicle is traveling outside of the recommended lane, maintain the automated driving state in the first automated driving state; and in a case that the remaining distance is shorter than the predetermined distance, or in a case that the remaining time is shorter than the predetermined time period, and in the case that the host vehicle is traveling outside of the recommended lane, cause the automated driving state to transition from the first automated driving state to the second automated driving state.

6. The vehicle control device according to claim 1, wherein the one or more processors cause the vehicle control device to:

set the recommended lane in the travel route in which the one or more travel lanes are included;

determine whether or not the host vehicle is traveling in the recommended lane;

in a case that the host vehicle is traveling outside of the recommended lane, perform a lane change control into the recommended lane; and in a case that the destination is deleted or changed during the lane change control, determine whether to stop or continue the lane change control based on a degree of progress of the lane change.

7. A vehicle control device, comprising one or more processors that execute computer-executable instructions stored in a memory, wherein the one or more processors execute the computer-executable instructions to cause the vehicle control device to:

instruct initiation of automated driving of a host vehicle by an operation of a vehicle occupant;

set a destination by an operation of the vehicle occupant, together with generating a travel route to the destination in accordance with setting of the destination;

specify a travel position of the host vehicle;

set an automated driving state, together with performing a travel control for the host vehicle in accordance with the automated driving state; and issue a notification to the vehicle occupant;

wherein the one or more processors cause the vehicle control device to:

set the automated driving state to a first automated driving state in which the host vehicle is made to travel by the automated driving to the destination, in a case that the initiation of automated driving is instructed in a state in which the destination has been set;

set the automated driving state to a second automated driving state in which the host vehicle is made to travel by the automated driving along a road, in a case that the initiation of automated driving is instructed in a state in which the destination has not been set; and perform a lane change control in the first automated driving state and the second automated driving state; and issue a first notification in a case that the lane change control is suspended in the first automated driving state, and issue a second notification that differs from the first notification in a case that the lane change control is suspended in the second automated driving state.

8. A vehicle control device, comprising one or more processors that execute computer-executable instructions stored in a memory, wherein the one or more processors execute the computer-executable instructions to cause the vehicle control device to:

instruct initiation of automated driving of a host vehicle by an operation of a vehicle occupant;

set a destination by an operation of the vehicle occupant, together with generating a travel route to the destination in accordance with setting of the destination; and set an automated driving state, together with performing a travel control for the host vehicle in accordance with the automated driving state;

set the automated driving state to a first automated driving state in which the host vehicle is made to travel by the automated driving to the destination, in a case that the initiation of automated driving is instructed in a state in which the destination has been set;

set the automated driving state to a second automated driving state in which the host vehicle is made to travel by the automated driving along a road, in a case that the initiation of automated driving is instructed in a state in which the destination has not been set; and prohibit a lane change operation by the automated driving, in a case that the destination is canceled or changed during the travel control in the first automated driving state.

* * * * *

UNITED STATES PATENT AND TRADEMARK OFFICE
CERTIFICATE OF CORRECTION

PATENT NO. : 11,440,558 B2
APPLICATION NO. : 16/718974
DATED : September 13, 2022
INVENTOR(S) : Ishioka et al.

It is certified that error appears in the above-identified patent and that said Letters Patent is hereby corrected as shown below:

In the Specification

Column 15, Line 58, after "present" insert --invention.--.

In the Claims

Column 16, Line 19 (25th Line of Claim 1), change "set wherein" to --set, wherein--.

Signed and Sealed this
Twenty-eighth Day of March, 2023

Katherine Kelly Vidal
*Director of the United States Patent and Trademark Office*